Figure 1:
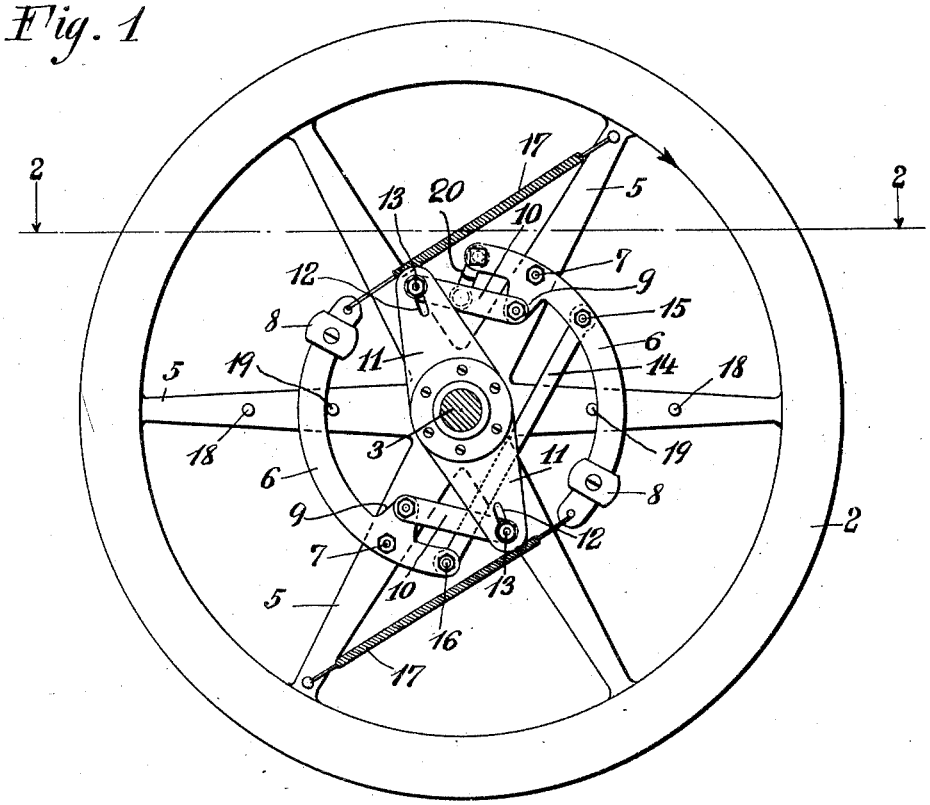

G. A. WEBER.
GOVERNING DRIVING MECHANISM.
APPLICATION FILED NOV. 25, 1910.

1,009,706.

Patented Nov. 21, 1911.
2 SHEETS—SHEET 1.

Witnesses:
Edmund O Dubocq

Inventor
George A. Weber
By his Attorneys

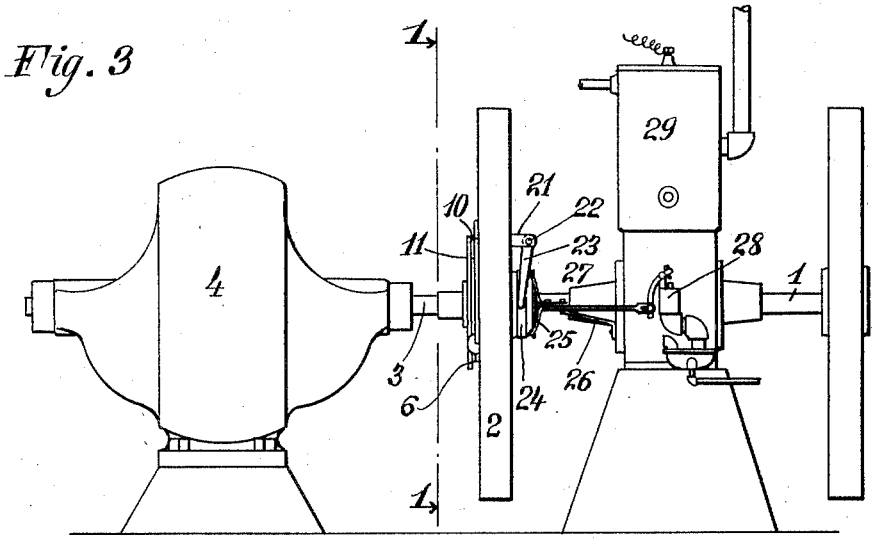
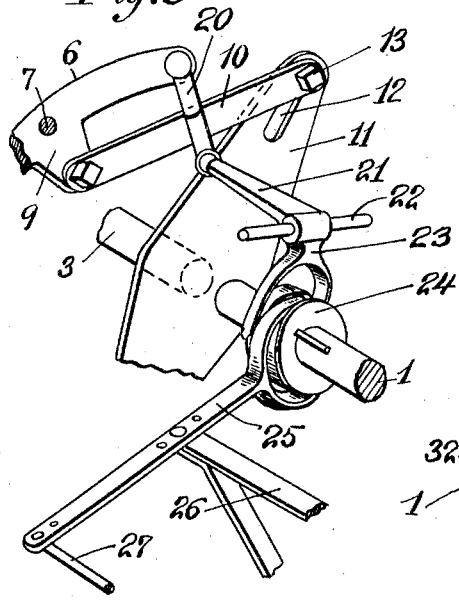
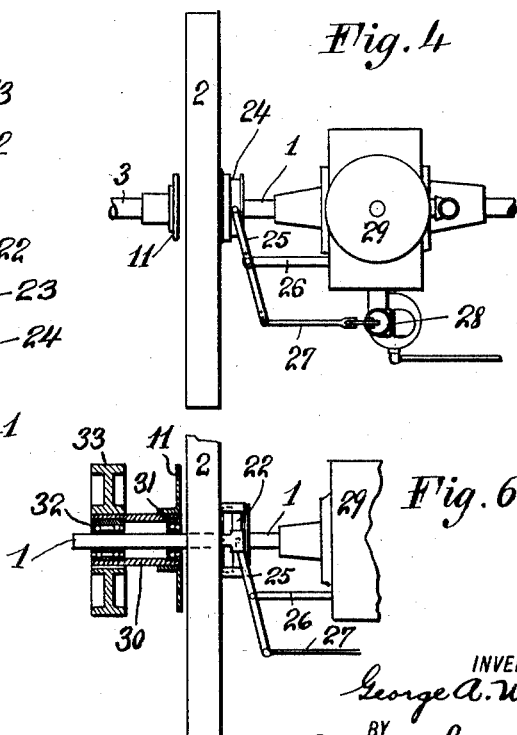

UNITED STATES PATENT OFFICE.

GEORGE A. WEBER, OF TRENTON, NEW JERSEY, ASSIGNOR TO CARL F. ADAM, OF TRENTON, NEW JERSEY.

GOVERNING DRIVING MECHANISM.

1,009,706.  Specification of Letters Patent.  Patented Nov. 21, 1911.

Application filed November 25, 1910. Serial No. 594,128.

*To all whom it may concern:*

Be it known that I, GEORGE A. WEBER, a citizen of the United States, residing at Trenton, in the county of Mercer and State of New Jersey, have invented certain new and useful Improvements in Governing Driving Mechanism, of which the following is a full, clear, and exact specification.

This invention relates to governing driving mechanism, and has particular reference to a mechanism wherein the displacement of a flexible power transmitting coupling will be caused to automatically regulate the speed of a driving shaft according to the variation in load on the driven element, such as a shaft, pulley, or other device.

According to this invention, I have provided a combined coupling and governing apparatus adapted to be interposed between a driving shaft and a driven shaft, pulley or other device, whereby the variation of load on the driven shaft, such for instance that due to a pulley, dynamo, screw propeller, pump or other machine, may be caused to automatically regulate the power developed by a prime mover, such as a steam or gas engine, motor, or the like, so as to maintain the speed approximately constant, or within predetermined limits of variation. The invention is also applicable where the driving and driven elements are not in alinement.

In this invention, I propose to obtain the regulating effect by means of a flexible coupling which shall be displaceable in instant response to variations in torque or load and to connect a throttle or other governing device therewith so as to be actuated instantly to vary the power as the torque or drag of the driven element varies. By such a mechanism this invention is distinguished from well known types of governors actuated by centrifugal force and which are only responsive to variations in speed. Consequently, such devices are relatively slow in action, since there may be a very wide variation in the drag of a driven element before a centrifugally actuated governor can move to a sufficient extent to correspondingly vary the power.

According to the embodiment of the invention herein described, I have provided a driving shaft coupled to a driven shaft, pulley, or other device, by means of crank arms and suitably disposed lever and link connections, such that with a constant load the levers and links assume a position of equilibrium, but when the load varies, the pull exerted on the lever varies, causing it to assume a different position, and through suitable connections to vary the power of the prime mover.

The invention will be more fully understood in connection with the description of the accompanying drawing, wherein—

Figure 2:
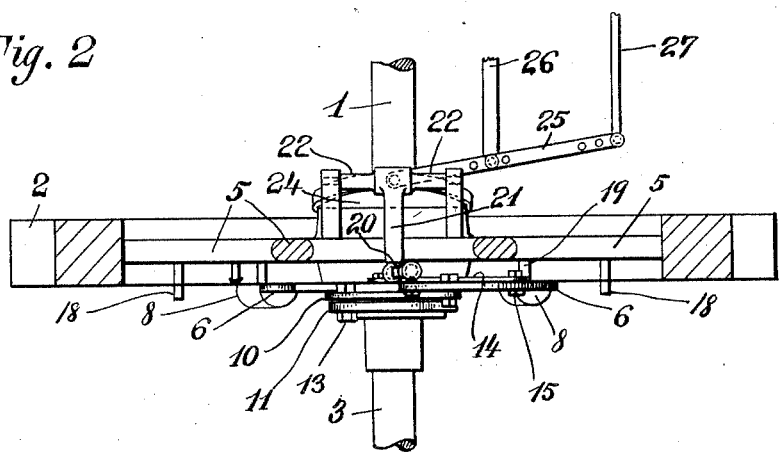

Figure 1 is an elevation of mechanism embodying the invention; Fig. 2 is a horizontal section; Fig. 3 is an elevation showing the invention applied to the driving of a generator from a gas engine; Fig. 4 is a plan view thereof; Fig. 5 is a detail on an enlarged scale of the driving and regulating connections applicable to any suitable purpose, and Fig. 6 shows a modification.

1 represents a driving shaft having thereon a fly wheel 2, and 3 represents the driven element or shaft which may, as herein shown, be the armature shaft of an electric generator 4. Instead of a generator, a pump, screw propeller, or any other device driven by a prime mover and subject to varying load, may be advantageously driven at a substantially constant speed, and the prime mover regulated by means of this invention. In Fig. 6, I show a belt pulley thus driven.

Mounted on each of opposite arms 5 of flywheel 2, or on separate diametrically disposed arms rigid with the driving shaft 1, are bell crank levers 6. These levers are each pivoted at 7 and are preferably curved in shape, the free end carrying an adjustable weight 8 and the radially short end 9 being connected by a link 10 to arms or coupling plates 11, rigid with driven shaft 3. The arms 11 are radially slotted as at 12, and the end of the link radially attached thereto is adjustable in the slot by means of bolts and nuts 13, so as to permit the connection of the link 10 to be readily adjusted toward or from shaft 3, so as to permit the driven shaft to exert a more or less pull on the levers 6. As herein shown the levers 6 are in duplicate, that is, one is disposed diametrically opposite the other, and these levers are connected by an equalizing link 14, pivoted to one lever at 15 and to the other lever at 16. The free ends of the levers 6 are connected by springs 17 to the arms 5 on which the levers 6 are pivoted, or to some other revolving part. Means is also provided, as by pins 18, 19, for limiting the extreme positions of the levers 6, so that at one speed the power will not be cut down too much and at another speed it will not be turned on too much, as will be more fully explained hereinafter. In order to actuate the regulator, the short end of one of the levers 6 is connected by a link 20 and ball and socket joints to a bell crank lever 21 mounted on a short pivot stud 22, carried in brackets mounted on the driving shaft 1, so as to rotate therewith. The other end 23 of the bell crank lever is connected to actuate a sliding grooved collar 24 splined on shaft 1. 25 is a forked lever carried on a fixed non-rotatable bracket 26, having its forked end engaging in the groove of the sliding collar 24, and its outer end connected as by a link rod 27 to a throttle or other regulating device. As herein shown, the rod 27 is connected to the throttle 28 of a gas engine 29, which supplies power to drive the shaft 1. It will be seen that suitable adjustments are provided in lever 25, so as to obtain any desired degree of actuation of the throttle or other power controlling device.

When at rest, the levers 6 will be pulled in toward the center by the springs, thus opening wide the throttle or power controlling device, and as the machine picks up speed, the centrifugal force caused by the weights 8 on levers 6 will balance the pull or drag exerted by the driven shaft through the arms 11, links 10, and short arms 9 of levers 6. Consequently, the levers assume a mean position of equilibrium, while the drag or load of the driven element remains constant. The instant this load varies the equilibrium is disturbed, and consequently the levers are displaced and assume a different position, and thereby regulate the power controlling devices according to the instantaneous position of the levers. It will be seen that these levers form an integral part of the power transmitting connections, and thereby, so far as I am informed, distinguish from the commonly known governing devices, wherein a centrifugal device has to change its position by variation in speed before producing any regulating effect. Compared with the device of this invention, such centrifugal regulators are slow and correspondingly unreliable.

It will be seen that my device is capable of being used to connect two shafts which run in alinement, and when so used performs the function of a universal joint as well as a power transmitting coupling displaceable according to the load. By means of the adjustments provided, variation powers can be provided for in a single device, and without requiring expensive connections or additional parts.

In Fig. 6 the invention has been shown applied to the driving of a pulley 33, having bearings 32 on an extension of the driving shaft 1, the hollow pulley shaft 30, or the hub of the pulley being equivalent in function to the driven shaft 3.

It will be seen that various modifications and changes can be made and the invention is not to be restricted to the precise construction herein shown, nor to any particular use, as it has a wide field of usefulness in all power transmitting mechanism.

Having thus described my invention, I declare that what I claim as new and desire to secure by Letters Patent, is—

1. The combination with a driving and a driven element, of a flexible power transmitting coupling between said elements composed in part of a centrifugal device responsive to variations in both speed and torque, and power regulating means controlled by the displacement of said coupling when the driving torque varies.

2. The combination with a driving and a driven element, of a flexible power transmitting coupling between said elements responsive to variations in torque, said coupling comprising a link and a weighted lever, power regulating means connected to the lever, and means whereby the lever varies in position according to the difference between the driving force and the load.

3. The combination with a driving and a driven element, of a driving power transmitting connection between said elements including a centrifugal device between and connected to both elements in such manner that the position of the centrifugal device varies according to the load.

4. The combination with a driving and a driven element, of a power transmitting connection between said elements comprising a weighted lever pivoted on one of said elements, a link connected to said lever and to the other element, and means connected to and controlled by the position of the lever for regulating the speed of the driving element.

5. The combination with a driving shaft and a driven element, of a power transmitting link connection between said shaft and said element, a lever pivoted on said driving shaft having a connection to said link at one portion and a weight at another portion tending by centrifugal force to oppose the drag exerted on said lever by said driven element, and controlling means connected to said lever.

6. The combination with a driving and a driven shaft, of a centrifugal device mounted on one shaft, power transmitting connections between said centrifugal device and the other shaft arranged to cause the load to oppose the centrifugal force, and means controlled by the resultant position of said centrifugal device for regulating the power applied to the driving shaft.

7. The combination with a shaft, of a centrifugal device, a driven element, power transmitting connections between said centrifugal device and said driven element for opposing the load to the centrifugal force, a prime mover, and means controlled by the resultant position of said centrifugal device for regulating said prime mover.

8. The combination with a shaft, of a pair of weighted levers, a second shaft having a pair of arms, connections between said arms and said levers arranged to cause the load to oppose the centrifugal force of the weights, and means controlled by the resultant positions of said levers for regulating the power.

9. The combination with a shaft, of a bell crank lever pivoted thereon, a link connected to one end of said lever, a second shaft connected to said link, the free end of said lever being arranged to permit its centrifugal force to oppose the force transmitted by the link, and power regulating means controlled by said lever.

10. The combination with a shaft, of a plurality of bell crank levers pivoted thereon at a distance from its center, links connected to corresponding ends of said levers, a second shaft connected to said links, the free ends of said levers being arranged to permit their centrifugal force to oppose the forces transmitted by the links, equalizing means connecting said levers, and power regulating means controlled by said levers.

11. The combination with a shaft having a radial arm, of a bell crank lever pivoted on said arm in a transverse plane, a transversely extending link connected to one end of said lever, a second shaft having a radial arm connected to said link, and power regulating means controlled by said lever.

12. The combination with a shaft having a radial arm, of a bell crank lever pivoted on said arm in a transverse plane, a transversely extending link connected to one end of said lever, a second shaft having a radial arm connected to said link, a second bell crank lever mounted on said first shaft and connected to said first lever, a sliding collar operated by said second lever, and power regulating means connected to said sliding collar.

13. The combination with a driving and a driven element, of a weighted lever mounted on one element to be moved centrifugally in one direction, a link connected to said lever and to the other element to cause the drag of the load to oppose the centrifugal movement of the lever, and power controlling means connected to said lever and actuated thereby when the balance between the centrifugal force and the drag of the load on the lever is varied.

14. The combination with a shaft having a radial arm, of a bell crank lever pivoted on said arm in a transverse plane, a transversely extending link connected to one end of said lever, a second shaft having a radial arm connected to said link, means for radially varying the connection of said link to said arm, and power regulating means controlled by said lever.

15. The combination with a driving and a driven element, of a governing and power transmitting coupling connecting said elements, comprising a lever mounted on one element at a point outside the axis of rotation having one end responsive to centrifugal force and the other end connected to the other of said elements, power controlling means, and controlling connections between said means and a movable portion of said lever.

16. The combination with rotatable driving and driven elements, of a coupling between said elements comprising a lever pivoted on one of said elements to move in a plane transverse to the axis of rotation, connecting means between one part of said lever and the other element, and a weight on another portion of said lever, the centrifugal force of which opposes the drag of the load applied to said lever through said connection.

In testimony whereof I affix my signature in presence of two witnesses.

GEORGE A. WEBER.

Witnesses:
FRANCIS C. LOUTHROP,
ELWOOD W. MOORE, Jr.

---

Copies of this patent may be obtained for five cents each, by addressing the "Commissioner of Patents, Washington, D. C."